United States Patent [19]

Winkler et al.

[11] 3,868,708
[45] Feb. 25, 1975

[54] FILM METERING MECHANISM FOR CAMERAS

[75] Inventors: Alfred Winkler, Munich; Dieter Engelsmann, Unterhaching; Horst Karl, Munich; Rolf Schröder, Baldham; Karl Wagner, Ottobrunn, all of Germany

[73] Assignee: Agfa-Gevaert Aktiengesellschaft, Leverkusen, Germany

[22] Filed: Sept. 12, 1973

[21] Appl. No.: 396,454

[30] Foreign Application Priority Data
Sept. 13, 1972 Germany.......................... 2244824

[52] U.S. Cl. .............................................. 354/206
[51] Int. Cl. ........................................... G03b 19/04
[58] Field of Search ........... 95/31 FM, 31 AC, 31 F; 354/206, 213

[56] References Cited
UNITED STATES PATENTS

| | | | |
|---|---|---|---|
| 3,532,040 | 10/1970 | Ehgartner et al. ................ | 95/31 FM |
| 3,603,236 | 9/1971 | Engelsmann...................... | 95/31 FM |
| 3,673,941 | 7/1971 | Williams........................... | 95/31 AC |
| 3,736,854 | 6/1973 | Beach .............................. | 354/207 X |
| 3,736,854 | 6/1973 | Beach .............................. | 95/31 FM |
| 3,748,991 | 7/1973 | Beach .............................. | 95/31 FL |

FOREIGN PATENTS OR APPLICATIONS
1,242,089 6/1967 Germany.......................... 95/31 FL Primary Examiner—Samuel S. Matthews
Assistant Examiner—Kenneth C. Hutchison
Attorney, Agent, or Firm—Michael S. Striker

[57] ABSTRACT

A still camera for use with roll film having a row of perforations, one for each film frame, is provided with a pivotable feeler which is biased against the film during actuation of the film transporting mechanism to penetrate into an oncoming perforation and to initiate the stoppage of film transport in response to entrainment by the moving film. The transport of film is terminated by a locking lever which becomes disengaged from a gear for the cocking of the shutter in response to pivoting of a displacing lever which normally biases the feeler against the film and is free to disengage the locking lever from the gear when the feeler penetrates into an oncoming perforation. A bell crank lever serves to return the feeler to a starting position in response to extraction of the feeler from the adjacent perforation; such extraction takes place in response to renewed transport of the film by the length of a frame subsequent to the making of an exposure. The making of an exposure results in automatic disengagement of the displacing lever from the locking lever so that the latter is free to block the gear against rotation while the film transporting mechanism advances the film.

25 Claims, 4 Drawing Figures

FILM METERING MECHANISM FOR CAMERAS

BACKGROUND OF THE INVENTION

The present invention relates to photographic apparatus in general, especially to still cameras for use with roll film having a row of perforations, one for each film frame, and being adjacent to one side of a web of backing paper. More particularly, the invention relates to photographic apparatus wherein a feeler bears against the film and penetrates into an oncoming perforation to thereby (or shortly thereafter) initiate the stoppage of film transporting mechanism at the exact moment when the foremost unexposed film frame is in accurate register with the picture taking lens.

It is already known to employ in a still camera a spring-biased feeler which can penetrate into an oncoming perforation of the film while the film transporting mechanism is actuated to advance the film lengthwise upon completion of an exposure. A drawback of heretofore known cameras is that the spring-biased feeler exerts an excessive force against the film during the making of exposures whereby the film is likely to change its position during exposure of the foremost unexposed film frame to scene light.

SUMMARY OF THE INVENTION

An object of the invention is to provide a photographic apparatus, especially a still camera for use with roll film which is confined in a magazine, wherein the feeler is constructed, mounted and operated in such a way that it cannot change the position of the film during the making of exposures.

Another object of the invention is to provide a photographic apparatus with novel and improved means for temporarily biasing the feeler against the film or back to a predetermined position upon completion of an exposure.

A further object of the invention is to provide a novel and improved operative connection between the input means which is used to actuate the film transporting mechanism and the aforementioned means for biasing the feeler.

An additional object of the invention is to provide a still camera wherein the feeler cooperates with backing paper for the film during the making of exposures to prevent any shifting of the film while the foremost unexposed film frame is being exposed to scene light.

Still another object of the invention is to provide a still camera wherein the feeler can be automatically extracted from the adjacent perforation in response to renewed transport of film upon completion of an exposure.

The improved photographic apparatus can be used with roll film having a row of perforations, one for each film frame, and preferably constitutes a still camera for use with roll film which is stored in a magazine and one side of which is adjacent to a web of backing paper. The apparatus comprises film transporting means which is actuatable to move the film lengthwise in a predetermined direction and along a predetermined path (the film transporting means may comprise a rotary take-up reel in the magazine and a train of gears which can rotate the takeup reel in a direction to collect the film), input means (e.g., a reciprocable plate) which is operable to actuate the film transporting means, preferably during a first stage of its movement from a first or starting position to a predetermined second or end position, a movably mounted feeler which is adjacent to the path for film and is in register with the row of perforations in the film so that it can penetrate into an oncoming perforation when the film moves lengthwise and to thereupon move from a first to a second position in response to continued lengthwise movement of film along the path, locking means (e.g., a two-armed lever) which is operable to deactivate the film transporting means in response to movement of the feeler to its second position, displacing means (which may comprise a pivotable lever and relatively strong resilient means for biasing the lever against the feeler) arranged to bias the feeler against the film while the feeler dwells in its first position and while the film transporting means is being actuated to move a perforation toward the feeler, and restoring means (e.g., a bell crank lever and a spring which urges the bell crank lever against the feeler) for biasing the feeler to the first position of the feeler upon completion of movement of the feeler to its second position.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
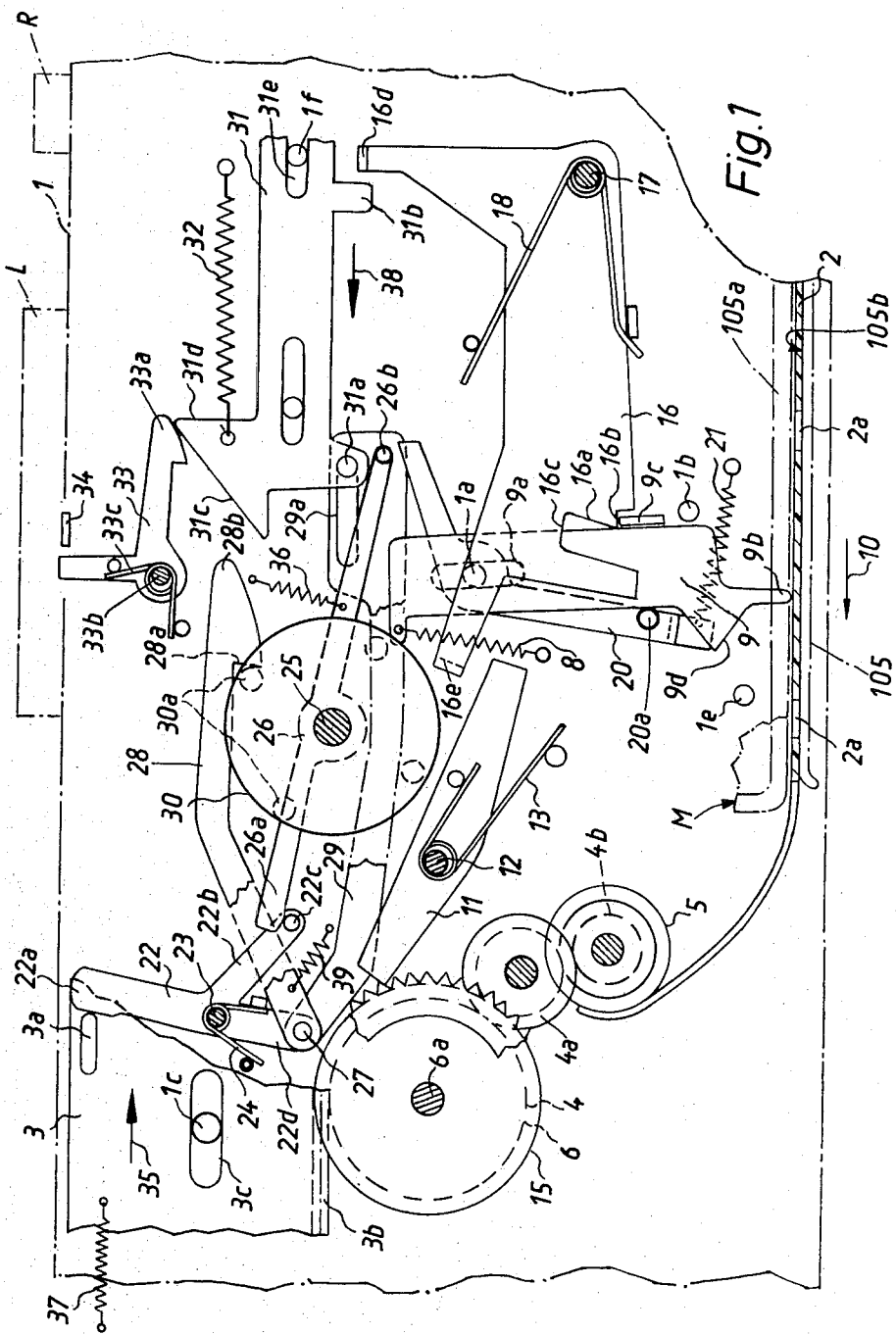
FIG. 1 is an enlarged fragmentary horizontal sectional view of a still camera which embodies the invention, the feeler being shown in its first position and prior to penetration into an oncoming perforation of the film which is being advanced by the transporting means.

Referring first to FIG. 1, there is shown a portion of a still camera which can be used with photographic roll film 2 having a row of perforations 2a, one for each film frame. The film 2 is preferably shielded by a web of backing paper, not shown, which is adjacent to the underside of the film, as viewed in FIG. 1. A cassette or magazine M for the film 2 and backing paaper is inserted into the housing or body 1 of the camera so that the takeup reel 5 therein is located to the left and the supply reel (not shown) is located to the right of the picture taking lens L. The casing of the magazine M is of customary design; it comprises a substantially cylindrical supply section which contains the supply reel, a similar takeup section which contains the reel 5, and an intermediate section 105 which defines for the film 2 and backing paper an elongated path and is provided with a window 105a in register with the lens L. When the camera is ready to make an exposure, the foremost unexposed film frame is in register with the window 105a of the intermediate section 105 and can be exposed to scene light in response to depression of a camera release R which actuates the shutter in or behind the mount of the picture taking lens L. The channel which forms a portion of the path for photographic film 2 in the intermediate section 105 is shown at 105b.

The housing 1 contains a fixed guide pin 1a extending into the elongated slot 9a of a feeler 9 which is biased counterclockwise, as viwed in FIG. 1, by a helical spring 8 and has a scanning portion or arm 9b normally bearing against the front side of the film 2 in line with the row of perforations 2a so that it penetrates into the oncoming perforation when the film is being transported in the direction indicated by an arrow 10. The arrangement is such that, when the scanning portion 9b penetrates into the oncoming perforation 2a, the film 2 continues to move in the direction of arrow 10 to thereby pivot the feeler 9 clockwise, as viewed in FIG. 1, from a first position toward a second position. The forward movement of the film 2 is terminated by the feeler 9 at the exact moment when the foremost unexposed film framae is in accurate register with the window 105a of the intermediate section 105.

The forward movement of film 2 is terminated, in response to clockwise pivoting of the feeler 9 about the pin 1a, by a locking lever 11 which is mounted in the housing 1 on a stationary pivot pin 12 and is biased counterclockwise by a torsion spring 13. The left-hand arm of the locking lever 11 normally engages the adjacent teeth of a gear 15 which constitutes one rotary output member of a transmission of the type disclosed, for example, in the commonly owned copending application Ser. No. 314,277, now Pat. No. 3,810,219, filed by Fauth on Dec. 11, 1972. The transmission has two output members one of which is the gear 15 and the other of which is a gear 4 serving to rotate the takeup reel 5 through the intermediary of an additional gear 4a. The gear 4a rotates a gear 4b which is coaxial with the takeup reel 5. The input member of the transmission is a reciprocable plate 3 having a toothed rack 3b which meshes with a pinion 6. The plate 3 has an elongated slot 3c for a stationary guide pin 1c of the housing 1. When the plate 3 is moved by hand in the direction indicated by an arrow 35, it stresses a return spring 37 and its rack 3b causes the pinion 6 to rotate clockwise. During a first stage of movement of the plate 3 from a predetermined starting position (determined by the surface flanking the right-hand end of the slot 3c in cooperation with the guide pin 1c), the pinion 6 rotates the gears 4, 4a, 4b and takeup reel 5 (which rotates clockwise to collect on its core the rearmost exposed frame of the film 2) while the locking lever 11 holds the gear 15 against rotation. When the scanning portion 9b penetrates into the oncoming perforation 2a of film 2 (which moves in the direction indicated by the arrow 10) and the film 2 thereupon entrains the scanning portion 9b to pivot the feeler 9 clockwise, the latter indirectly causes the locking lever 11 to pivot clockwise and to become disengaged from the gear 15. The next-following stage of movement of the plate 3 toward its right-hand end position then results in rotation of the gear 15 which cocks the shutter or performs another useful function while the gear 4 is at a standstill so that the foremost unexposed frame of the film 2 remains in register with the window 105a and picture taking lens L. The take-up reel 5 need not be positively locked against further clockwise rotation when the foremost unexposed film frame moves into register with the window 105a because the construction of the just described transmission is preferably such that the tension of film 2 suffices to hold the gear 4 against further rotation with the pinion 6 as soon as the locking lever 11 releases the gear 15. In other words, the resistance which the gear 15 offers to rotation with the pinion 6 (whene the gear 15 is disengaged from the locking lever 11) is normally less than the resistance which the gear 4 offers to rotation with the pinion 6 so that the first stage of movement of the plate 3 in the direction indicated by arrow 35 automatically entails the transport of film 2 by the length of a frame and the second stage of such movement of the plate 3 automatically effects a cocking of the shutter so that the camera is ready to make an exposure as soon as the rightward movement of the plate 3 is completed. The transmission is described in full detail in the aforementioned commonly owned copending application Ser. No. 314,277 of Fauth to which reference may be had it necessary. The resistance which the takeup reel 5 offers to rotation in response to clockwise rotation of the pinion 6 is enhanced by the feeler 9 whose scanning portion 9b then extends (with or without clearance) through the adjacent perforation 2a and bears against the backing paper which is also collected by the core of the takeup reel 5. The friction between the front (upper) side of backing paper and the tip of the scanning portion 9b assists the takeup reel 5 in successfully resisting rotation in a direction to collect the film 2 as soon as the left-hand arm of the locking lever 11 becomes disengaged from the adjacent teeth of the gear 15.

The scanning portion 9b of the feeler 9 extends through a suitable slot in the front panel of the intermediate section 105 of the magazine M when the latter is properly inserted into the housing 1 so that the tip of the portion 9b is in accurate register with the line of perforations 2a in the film 2. The feeler 9 further comprises a projection or follower 9c which may constitute a bent-over lug of the feeler and cooperates with a movably mounted displacing member here shown as a pivotable lever 16 mounted on a pin 17 in the housing 1 and being biased counterclockwise by a resilient element in the form of a torsion spring 18 which is preferably substantially stronger than the relatively weak helical spring 8 for the feeler 9. The lower edge face (as viewed in FIG. 1) of the displaing lever 16 has a relatively shallow notch or recess 16b, a deeper notch or recess 16c and a suitably inclined cam face 16a between the notches 16b, 16c. The notch 16b receives the follower 9c when the tip of the scanning portion 9b bears against the front side of the film 2 (i.e., when the scanning portion 9b does not extend into a perforation 2a). The surface bounding the deepmost portion of the notch 16b then bears against the follower 9c so that the torsion spring 18 assists the helical spring 8 in urging the tip of the scanning portion 9b against the film 2. The follower 9c tracks the cam face 16a in response to penetration of the scanning portion 9b into an oncoming perforation 2a whereby the torsion spring 18 is free to pivot the displacing lever 16 counterclockwise so that an impeller 16e of the lever 16 strikes against the right-hand arm of the locking lever 11 and disengages the left-hand arm of the lever 11 from the gear 15 as soon as the transport of film 2 by the length of a frame is completed. In other words, the spring 18 is free to propel the impeller 16e against the locking lever 11 only after the scanning portion 9b has penetrated into the oncoming perforation 2a and after the film 2 has thereupon caused the feeler 9 to pivot clockwise to the extent which is needed to move the follower 9c from the notch 16b. When the scanning portion 9b penetrates into the oncoming perforation 2a, it is engaged by the surface which flanks the right-hand end of the perforation, as viewed in FIG. 1, and such surface then entrains the scanning portion 9b in the direction indicated by the arrow 10. As mentioned above, the scanning portion 9b then bears against and frictionally engages the backing paper to assist the takeup reel 5 in successfully resisting rotation in response to clockwise rotation of the pinion 6 as soon as the locking lever 11 becomes disengaged from the gear 15. The backing paper behind the film 2 performs another desirable function, namely, to prevent excessive penetration of the scanning portion 9b into the adjacent perforation 2a of the film in the channel 105b.

Figure 2:
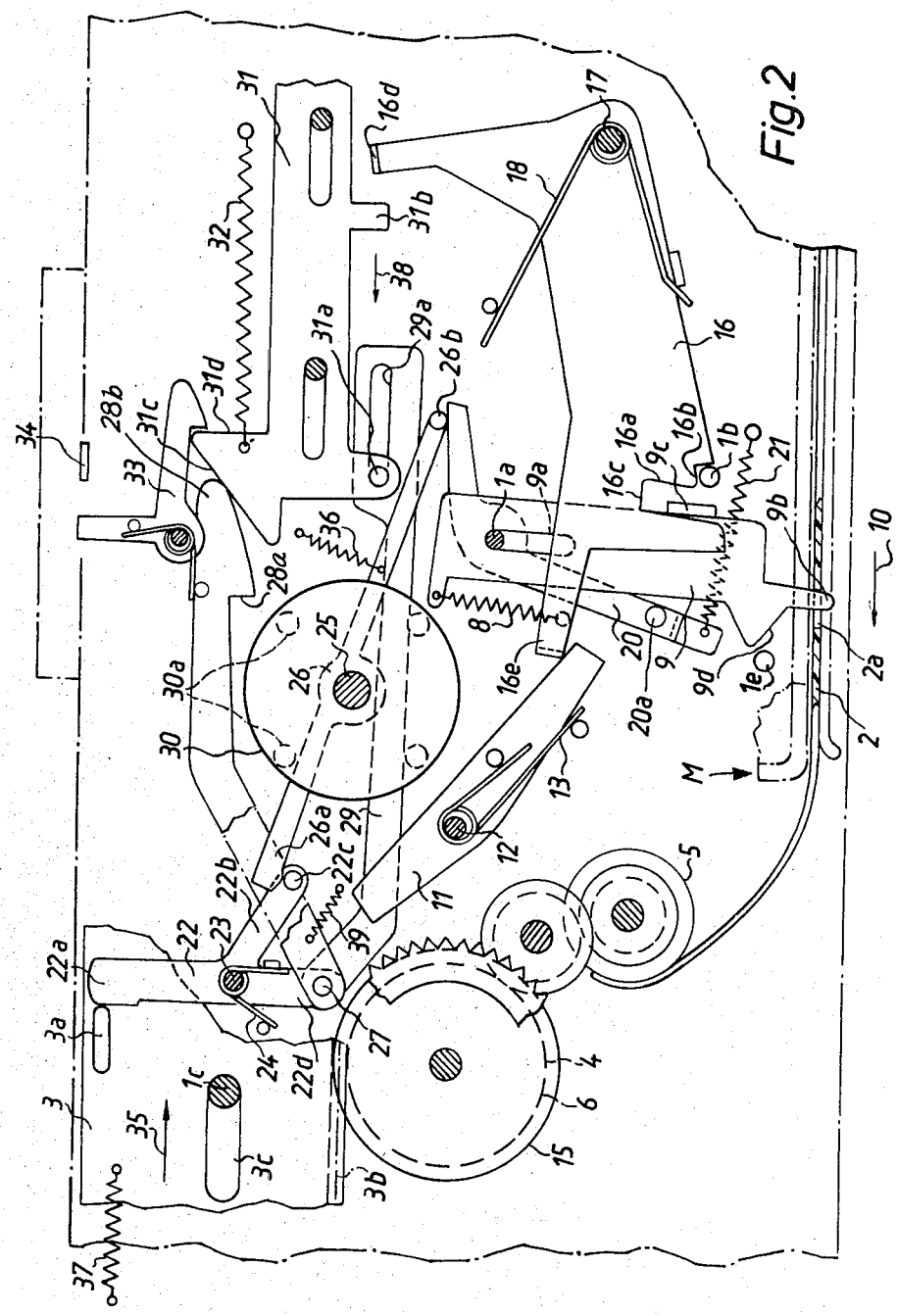
FIG. 2 illustrates the structure of FIG. 1 but with the feeler shown in the second position upon penetration into the adjacent perforation and upon completion of film transport by the length of a frame.

The housing 1 comprises a pin-shaped stop 1b which extends into the notch 16b when the displacing lever 16 reaches the end position shown in FIG. 2, i.e., after the impeller 16e has disengaged the locking lever 11 from the gear 15. The film 2 then maintains the follower 9c in abutment with the surface bounding the left-hand side of the deeper notch 16c so that the feeler 9 assumes a second position determined by the displacing lever 16 which then abuts against the stop 1b. It will be seen that, in the first position of the feeler 9, the follower 9c extends into notch 16b and the feeler 9 is immediately adjacent to or abuts against the stop 1b (FIG. 1). In the second position of the feeler 9, the follower 9c abuts against the lever 16 which then abuts against the stop 1b (FIG. 2); the follower is then located in the notch 16c and abuts against the surface bounding the left-hand side of the notch 16c.

The feeler 9 further cooperates with a restoring member here shown as a bell crank lever 20 which is pivotable on the guide pine 1a and is biased counterclockwise, as viewed in FIG. 1, by a resilient element in the form of a helical spring 21. The bell crank lever 20 has a projection 20a which can pivot the feeler 9 counterclockwise to thereby move the feeler into abutment with the stop 1b (first position of the feeler) as soon as the displacing lever 16 is pivoted clockwise in order to allow the follower 9c to enter the shallower notch 16b and as soon as the scanning portion 9c is expelled or extracted from the adjacent perforation 2a.

A shaft 23 in the housing 1 mounts a pivotable motion transmitting lever 22 which is adjacent to the right-hand end of the plate 3 and has an arm 22a which abuts against a projection 3a of the plate 3 under the action of a torsion spring 24. Thus, the motion transmitting lever 22 pivots clockwise when the operator causes the plate 3 to move in the direction indicated by the arrow 35 to stress the return spring 37. A second arm 22b of the motion transmitting lever 22 carries a pin 22c which engages the left-hand arm 26a of a two-armed control lever 26 mounted on a shaft 25 for an indexible socket 30 adapted to support the foot of a multiple flash lamp holder (not shown), e.g., a flash lamp holder of the type known as Magicube (trademark). The right-hand arm 26b of the control lever 26 carries a pin which can pivot the bell crank lever 20 against the opposition of the spring 21 so that the lever 20 allows the feeler 9 to pivot clockwise. A third arm 22d of the motion transmitting lever 22 carries a shaft 27 for an indexing pawl 28 adapted to index the socket 30. To this end, the socket 30 comprises four equidistant projections or legs 30a one of which can be engaged by a shoulder 28a of the pawl 28 when the latter is moved in a direction to the left, as viewed in FIG. 1. The shaft 27 further couples the arm 22d to one end of a pusher 29.

The other end of the pusher 29 has an elongated slot 29a for a pin 31a on a rearwardly extending lug of a disengaging slide 31 which is biased by a spring 32. The disengaging slide 31 has a pair of aligned slots 31e for stationary guide pins 1f of the housing 1. The slide 31 is further provided with a projection 31b which can engage a projection 16d of the displacing lever 16 so that the lever 16 is pivoted clockwise (against the opposition of the torsion spring 18) when the spring 32 is free to move the slide 31 counter to the direction indicated by an arrow 38. This prevents the torsion spring 18 from biasing the lever 16 against the feeler 9 in a direction to urge the scanning portion 9b against the film. Such movement of the lever 16 takes place when the portion 9b penetrates into a perforation. Still further, the slide 31 is formed with an inclined cam face 31c which can pivot a pawl 33, and with a shoulder 31d which can be engaged by a tooth 33a of the pawl 33. The pawl 33 is mounted on a fixed pin 33b and is biased clockwise, as viewed in FIG. 1, by a torsion spring 33c which tends to urge the tooth 33a against the cam face 31c. The pawl 33 can be pivoted counterclockwise by an entraining projection 34 of the shutter when the sutter opens in response to depression of the camera release R.

A helical spring 36 biases the control lever 26 counterclockwise, as viewed in FIG. 1, so that the arm 26a tends to bear against the pin 22c on the arm 22b of the lever 22. The feeler 9 is provided with an inclined cam face 9d which can be moved against and thereupon slides along a stationary abutment or post 1e in the housing. This enables the feeler 9 to move its slot 9a relative to the pin 1a and to withdraw the scanning portion 9b from the adjacent perforation 2a of the film 2.

The parts 29a, 31a constitute a simple coupling which enables the disengaging slide 31 to move, within limits, relative to the pusher 29 or vice versa.

The operation is as follows:

In order to transport the film 2 by the length of a frame and to cock the shutter, the operator moves the input member or plate 3 of the transmission in the direction indicated by the arrow 35. The rack 3b of the plate 3 rotates the pinion 6 clockwise whereby the pinion 6 rotates the takeup reel 5 clockwise through the intermediary of the gear train 4, 4a, 4b. During the first stage of movement of the plate 3 in the direction of arrow 35, the tip of the scanning portion 9b bears against the front side of the film 2 which advances in the direction indicated by the arrow 10 and the follower 9c extends into notch 16b of the displacing lever 16 so that the locking lever 11 is free to hold the gear 15 against rotation.

The projection 3a of the plate 3 causes the arm 22a to pivot the motion transmitting lever 22 clockwise, as viewed in FIG. 1. The pin 22c on the arm 22b thereby enables the spring 36 to pivot the control lever 26 counterclockwise whereby the arm 26b moves away from the bell crank lever 20 which can be pivoted counterclockwise by the spring 21.

When the plate 3 reaches its right-hand end position and is released, the return spring 37 contracts and returns the plate to its starting position. At the same time, the torsion spring 24 causes the motion transmitting lever 22 to pivot counterclockwise whereby the arm 22b causes the pin 22c to pivot the control lever 26 clockwise. The arm 26b pivots the bell crank lever 20 clockwise so that the projection 20a moves away from the feeler 9. FIG. 2 shows the plate 3 upon completed return movement to the starting position. It will be noted that the spring 21 is stressed by the bell crank lever 20 which is held in the illustrated position by the arm 26b so that the spring 21 cannot bias the projection 20a against the feeler 9.

Referring again to those stages of movement of the plate 3 when the latter moves in the direction indicated by the arrow 35, the motion transmitting lever 22 (which pivots clockwise) causes its arm 22d and the shaft 27 to move the indexing pawl 28 in a direction to the left whereby the shoulder 28a of the pawl 28 engages the adjacent leg 30a of the socket 30. The socket 30 is indexed in a counterclockwise direction through an angle of 90° and comes to a halt when a fresh (unfired) flash lamp in the multiple flash lamp holder faces the subject. The arrangement may be such that the socket 30 snaps over to the next angular position as soon as it has been caused to turn through a predetermined angle (e.g., an angle of 45° or 60°. The shoulder 28a is then disengaged from the previously entrained projection and the indexing pawl 28 is free to return to the position of FIG. 1 whereby the tooth 28b of the pawl 28 tends to ride over and to thereupon move the shoulder 28a behind the next leg 30a. The pawl 28 is biased clockwise, as viewed in FIG. 1, by a weak helical spring 39. When the plate 3 returns to its starting position (see FIG. 2), the tooth 28b of the indexing pawl 28 abuts against the inclined cam face 31c of the slide 31.

The clockwise pivoting of the motion transmitting lever 22 by the projection 3a of the plate 3 further results in a movement of the pusher 29 (which is coupled to the shaft 27 on the arm 22d) in a direction to the left (see the arrow 38). The slotted right-hand portion of the pusher 29 thereby entrains the disengaging slide 31 which stresses the spring 32 while moving in the direction indicated by the arrow 38. The cam face 31c of the slide 31 pivots the pawl 33 until the shoulder 31d moves beyond and is thereupon engaged by the tooth 33a of the pawl 33. The tooth 33a then prevents the spring 32 from returning the disengaging slide 31 to its right-hand end position.

The movement of the plate 3 to its right-hand end position is terminated when the guide pin 1c of the housing 1 is located in the left-hand end portion of the slot 3c. As mentioned above, the plate 3 is then released so that it can return to its starting position under the action of the spring 37 whereby the torsion spring 24 biases the motion transmitting lever 22 counterclockwise so as to maintain the arm 22a in abutment with the projection 3a. The lever 22 then moves the pusher 29 in a direction to the right whereby the slot 29a travels relative to the pin 31a of the disengaging slide 31. It will be recalled that the slide 31 is held in the position shown in FIG. 3 by the tooth 33a of the pawl 33. The right-hand end position of the pusher 29 relative to the slide is shown in FIG. 2.

When the plate 3 reassumes the starting position of FIG. 2, the window 105a registers with the foremost unexposed frame of the film 2 and the shutter is cocked. The feeler 9 is then biased only by the weak helical spring 8 because the projection 20a of the bell crank lever 20 is disengaged from the feeler 9 by the arm 26b of the control lever 26 and the displacing lever 16 bears against the stop 1b. Thus, the springs 18 and 21 cannot bias the scanning portion 9b against the film 2. The bias of the spring 8 is preferably so weak that it cannot adversely influence the position of the foremost unexposed film frame with respect to the window 105a and picture taking lens L.

If the operator thereupon wishes to make an exposure, the release R is depressed to release the shutter which opens and moves its entraining projection 34 in a direction to the left (arrow 38) so that the projection 34 disengages the tooth 33a of the pawl 33 from the shoulder 31d of the disengaging slide 31. The spring 32 is free to contract and the pin 31a travels relative to the slot 29a of the pusher 29. The cam face 31c moves away from the tooth 28b of the indexing pawl 28 so that the shoulder 28a can move behind the adjacent leg 30a of the socket 30, i.e., the socket 30 is ready to be indexed through 90° in response to renewed movement of the plate 3 in the direction indicated by the arrow 35. The indexing pawl 28 is biased clockwise by the spring 39 which is just strong enough to move the pawl 28 into abutment with the nearest leg 30a.

Figure 3:
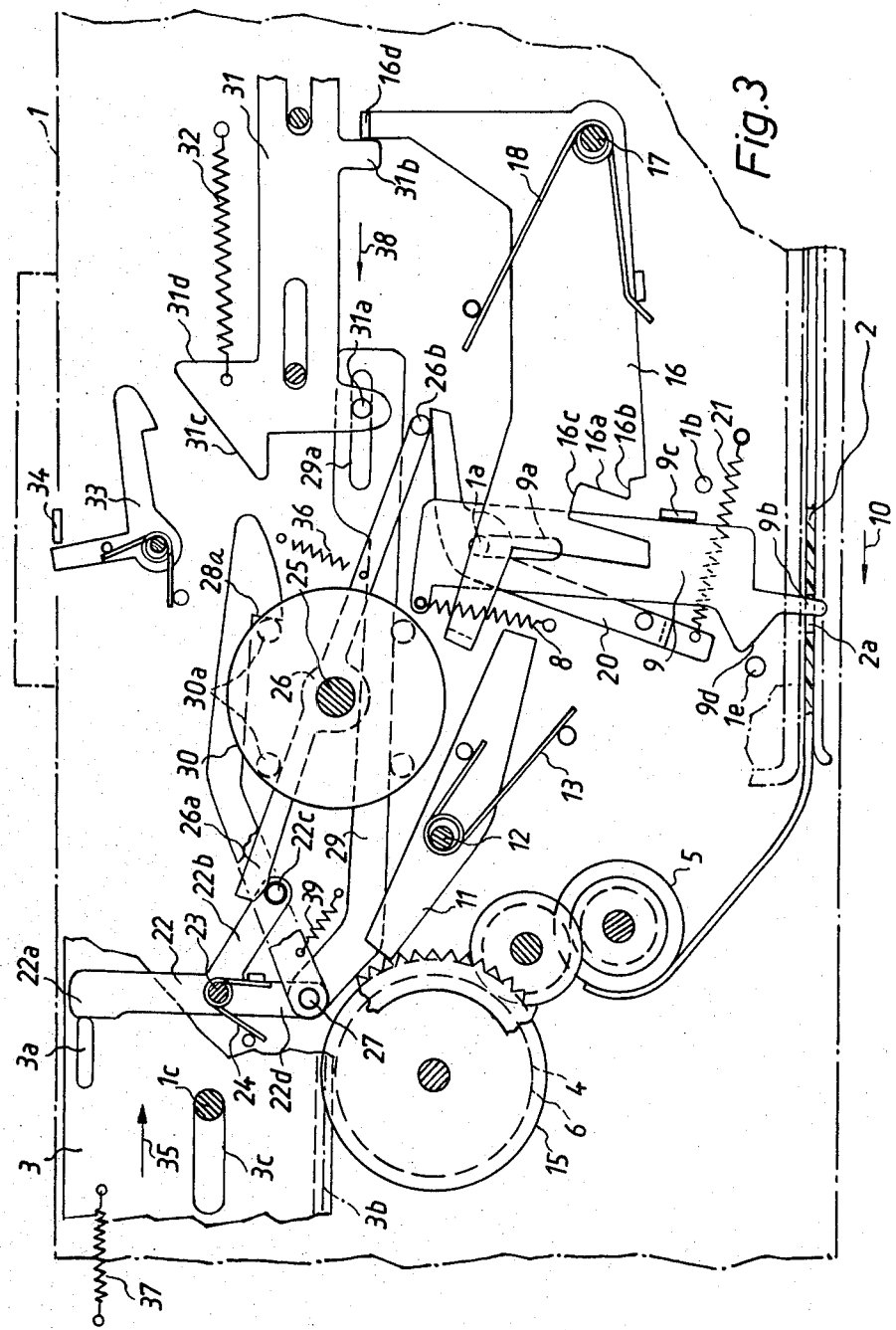
FIG. 3 illustrates the structure of FIG. 1 or 2, with the feeler shown in the second position and with the displacing means disengaged from the feeler in response to opening of the shutter.

As the spring 32 contracts, the projection 31b of the disengaging slide 31 is propelled against the projection 16d so that the displacing lever 16 pivots clockwise and stresses the spring 18. The impeller 16a moves away from the right-hand arm of the locking lever 11 so that the latter pivots counterclockwise under the action of the torsion spring 13 and engages the adjacent teeth of the gear 15 which is thereby locked, i.e., it cannot rotate with the pinion 6. The bell crank lever 20 is still held by the arm 26b of the control lever 26, and the displacing lever 16 is held by the projection 31b of the disengaging slide 31 so that the scanning portion 9b of the feeler 9 extends into the adjacent perforation 2a exclusively under the action of the weak spring 8. As mentioned before, the tip of the scanning portion 9b then bears against the backing paper in the intermediate section 105 of the magazine M. The just described positions of the parts are shown in FIG. 3.

When the operator thereupon decides to transport the film 2 by the length of a frame, the plate 3 is moved in the direction indicated by the arrow 35 so that the rack 3b rotates the pinion 6 which rotates the takeup reel 5 clockwise through the intermediary of the gear train 4, 4a, 4b of the film transporting mechanism. The film 2 advances in the direction indicated by the arrow 10 and pivots the feeler 9 clockwise against the opposition of the weak spring 8. The cam face 9d engages and slides along the abutment or post 1e of the housing 1 so that the scanning portion 9b is withdrawn from the adjacent perforation 2a and its tip begins to bear against the front side of the moving film 2 (see FIG. 4). As the plate 3 continues to move in the direction indicated by the arrow 35, the motion transmitting lever 22 causes the control lever 26 to release the bell crank lever 20 whose projection 20a begins to bear against the feeler 9 under the action of the spring 21. The feeler 9 is thereby pivoted against the stop 1b. The scanning portion 9b thereupon penetrates into the oncoming perforation 2a and the feeler 9 is pivoted clockwise by the film 2 to thereby cause the displacing lever 16 to disengage the locking lever 11 from the gear 15. This terminates the transport of film 2 and the cocking of the shutter begins in response to further movement of the plate 3 to its right-hand end position.

Figure 4:
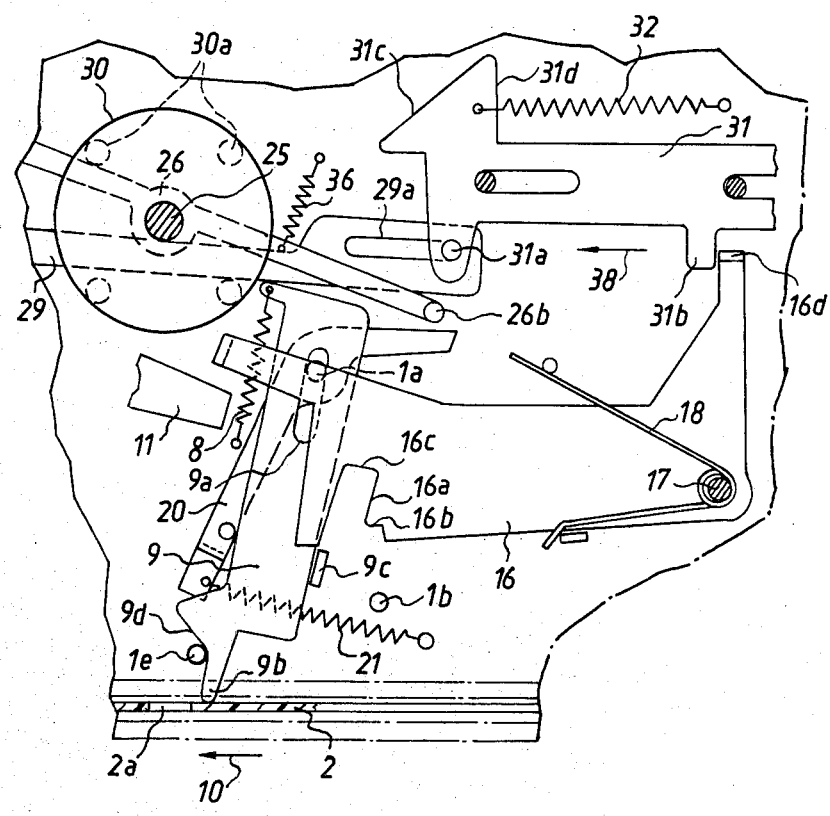
FIG. 4 illustrates a portion of the structure of FIG. 1, with the feeler shown in the second position but subsequent to expulsion from the adjacent perforation in response to renewed actuation of the film transporting means.

The parts 16, 18 constitute a displacing unit which urges the scanning portion 9b of the feeler 9 against the film 2 when the feeler 9 assumes the first position shown in FIG. 1 in which the feeler abuts against the stop 1b. The parts 20 and 21 constitute a restoring unit which biases the feeler 9 back to the first position (against the stop 1b) when the feeler 9 assumes a second position which is shown in FIG. 4 and in which the feeler abuts against the post 1e.

The improved camera is susceptible of many additional modifications. For example, it is desirable to provide a one-way clutch between the shaft 6a and the pinion 6 so that the pinion 6 can rotate relative to the gears 4 and 15 when the plate 3 moves back toward its starting position. Alternatively, the pinion 6 can be driven by the rack 3b through the intermediary of two additional gears one of which can rotate the other only in a direction to rotate the pinion 6 and the gears 4, 15 clockwise, as viewed in FIG. 1. This enables the plate 3 to return to the starting position without changing the angular positions of the gears 4 and 15. In other words, at least the gear 4 should be rotatable only in a clockwise direction. In accordance with another embodiment of the just discussed clutch, the teeth of the rack 3b and the teeth of the pinion 6 can be configurated in such a way that the pinion 6 is rotated (clockwise) only when the plate 3 is caused to move in the direction indicated by the arrow 35. This can be achieved by providing the rack 3b with sawtooth-shaped teeth which are yieldable side-ways to entrain the pinion 6 clockwise but to be ineffective when the plate 3 moves in a direction to the left, as viewed in FIG. 1.

It is further clear that the gear train 4, 4a, 4b between the pinion 6 and takeup reel 5 can be replaced with a gear train having a different transmission ratio. Moreover, such gear train can be replaced by a linkage or any other suitable power train which can rotate the takeup reel 5 clockwise in response to movement of the plate 3 in the direction indicated by the arrow 35.

It is further clear that at least some of the levers can be replaced by slidable parts or vice versa. For example, the motion transmitting lever 22 can be replaced with a slide having several projections which perform the functions of the arms 22a, 22b and 22d. The plate 3 and pinion 6 can be replaced by a simple input member which is rotatable between a predetermined starting position and a predetermined end position. The first stage of rotation of such rotary member results in the transport of roll film by the length of a frame and the second stage of such rotation results in disengagement of the locking lever 11 from the gear 15 or from another suitable output member to thus enable the rotary member to continue its angular movement toward its end position while the takeup reel is at a standstill. The arrangement may be such that the locking lever 11 engages the associated output member during the second stage of movement of the input member and is disengaged from the associated output member during the transport of film by the length of a frame.

It is further possible to replace one or more one-piece components of the camera with composite components, or vice versa. For example, the displacing lever 16 or the bell crank lever 20 can be replaced by composite displacing means or by a composite device which can be used to temporarily bias the feeler 9 counterclockwise.

Finally, the mounting of the feeler 9 is preferably such that, when the magazine M with film 2 is removed from the housing 1, the surface bounding the notch 16b of the displacing lever 16 maintains the feeler 9 in a position in which the lever 16 disengages the locking lever 11 from the gear 15. This enables the operator to test the film transporting mechanism in spite of the fact that the camera is not loaded with film.

An important advantage of the improved camera is that the feeler 9 cannot shift the film 2 lengthwise during the making of exposures because the feeler 9 is then biased only by the very weak spring 8. Moreover, and since the tip of the scanning portion 9b bears against the backing paper in the channel 105b, the backing paper holds the feeler against movement counter to the direction indicated by the arrow 10. The film abuts against the scanning portion 9b during the making of an exposure and, since the backing paper holds the feeler against movement under the action of the weak spring 8, the film remains in a position in which the foremost unexposed frame is in accurate register with the window 105a. The exact position of the feeler 9 during the making of exposures is determined by the film because the surface bounding the right-hand end of the perforation 2a into which the scanning portion 9b extends abuts against the scanning portion.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a photographic apparatus for use with roll film having a row of perforations, one for each film frame, particularly in a still camera for use with film which is stored in a magazine and one side of which is adjacent to a web of backing paper, a combination comprising film transporting means actuatable to move the film lengthwise in a predetermined direction and along a predetermined path; input means movable from a first to a second position to thereby actuate said film transporting means, and back to said first position; a movably mounted feeler adjacent to said path in line with the row of perforations and arranged to penetrate into an oncoming perforation when the film moves lengthwise and to thereupon move from a first to a second position in response to continued lengthwise movement of film; locking means operable to deactivate said film transporting means in response to movement of said feeler to said second position; means for biasing said feeler against the film while said feeler dwells in said first position and while said film transporting means is being actuated to move a perforation toward said feeler, including a movably mounted displacing member and means for yieldably urging said displacing member against said feeler in said first position of said feeler; means for biasing said feeler to said first position upon completion of movement of said feeler to said second position, comprising a movably mounted restoring member which abuts against said feeler during actuation of said film transporting means and means for yieldably urging said restoring member against said feeler in said second position of said feeler; disengaging means actuatable by said input means and arranged to disengage said displacing member from said feeler subsequent to penetration of said feeler into an oncoming perforation; and control means for disengaging said restoring member from said feeler in said first position of said input means.

2. A combination as defined in claim 1, wherein said displacing member is a first pivotably mounted lever and said restoring member is a second pivotally mounted lever.

3. A combination as defined in claim 1, further comprising motion transmitting means operatively connected with said input means and arranged to effect movements of said displacing member and said restoring member in response to movement of said input means.

4. A combination as defined in claim 3, wherein said motion transmitting means comprises a lever which is pivotable by said input means.

5. A combination as defined in claim 3, said disengaging means being interposed between said motion transmitting means and said displacing means, said disengaging means being arranged to disengage said displacing member from said feeler in response to the making of an exposure and to permit said displacing member to bias said feeler against the film in said path in response to movement of said input means to said second position.

6. A combination as defined in claim 1, wherein said displacing means comprises means for operating said locking means in response to movement of said feeler to said second position.

7. A combination as defined in claim 6, wherein said displacing member is movable between a first position corresponding to said first position of said feeler and in which said displacing member biases said feeler against the film in said path, and a second position corresponding to said second position of said feeler and in which said displacing member prevents said feeler from moving beyond said second position thereof.

8. A combination as defined in claim 7, further comprising stop means provided in the path of movement of said displacing member from said first position thereof and arranged to prevent said displacing member from moving beyond said second position.

9. A combination as defined in claim 1, wherein said input means is arranged to actuate said film transporting means during a first stage of movement to said second position, and further comprising output means movable by said input means during a second stage of movement of said input means to said second position, said locking means comprising a lever having a first arm normally engaging said output means to hold the latter against movement during said first stage of movement of said input means and a second arm pivotable by said displacing member in response to penetration of said feeler into an oncoming perforation to thereby disengage said first arm from said output means.

10. A combination as defined in claim 9, wherein said displacing member is arranged to pivot said second arm and to thus disengage said first arm of said lever from said output means in the absence of film in said path.

11. A combination as defined in claim 9, further comprising means for biasing said first arm of said lever against said output means.

12. A combination as defined in claim 1, wherein said feeler comprises a cam face and further comprising an abutment along which said cam face slides in response to actuation of said film transporting means in said second position of said feeler to thereby withdraw said feeler from the adjacent perforation of the film in said path.

13. In a photographic apparatus for use with roll film having a row of perforations, one for each film frame, particularly in a still camera for use with roll film which is stored in a magazine and one side of which is adjacent to a web of backing paper, a combination comprising film transporting means actuatable to move the film lengthwise in a predetermined direction and along a predetermined path; input means operable to actuate said film transporting means, said input means being movable between first and second positions to thereby actuate said film transporting means during movement from said first position; a movably mounted feeler adjacent to said path in line with the row of perforations and arranged to penetrate into an oncoming perforation when the film moves lengthwise and to thereupon move from a first to a second position in response to continued lengthwise movement of film along said path; locking means operable to deactivate said film transporting means in response to movement of said feeler to said second position; displacing means arranged to bias said feeler against the film while said feeler dwells in said first position and while said film transporting means is being actuated to move a perforation toward said feeler; restoring means arranged to bias said feeler to said first position upon completion of movement of said feeler to said second position; motion transmitting means operatively connected with said input means and arranged to effect movements of said displacing means and said restoring means in response to movement of said input means, said motion transmitting means comprising a lever which is pivotable by said input means; and resilient means for biasing said lever against said input means so that said lever pivots in one direction against the opposition of said resilient means in response to movement of said input means from said first position and that said resilient means pivots said lever in the opposite direction in response to movement of said input means to said first position.

14. In a photographic apparatus for use with roll film having a row of perforations, one for each film frame, particularly in still camera for use with roll film which is stored in a magazine and one side of which is adjacent to a web of backing paper, a combination comprising film transporting means actuatable to move the film lengthwise in a predetermined direction and along a predetermined path; input means operable to actuate said film transporting means, said input means being movable between first and second positions to thereby actuate said film transporting means during movement from said first position; a movably mounted feeler adjacent to said path in line with the row of perforations and arranged to penetrate into an oncoming perforation when the film moves lengthwise and to thereupon move from a first to a second position in response to continued lengthwise movement of film along said path; locking means operable to deactivate said film transporting means in response to movement of said feeler to said second position; displacing means arranged to bias said feeler against the film while said feeler dwells in said first position and while said film transporting means is being actuated to move a perforation toward said feeler; restoring means arranged to bias said feeler to said first position upon completion of movement of said feeler to said second position; motion transmitting means operatively connected with said input means and arranged to effect movements of said displacing means and said restoring means in response to movement of said input means; and control means interposed between said motion transmitting means and said restoring means and arranged to disengage said restoring means from said feeler in said first position of said feeler.

15. A combination as defined in claim 14, wherein said control means is a lever which is pivoted by said motion transmitting means into engagement with and thereby disengages said restoring means from said feeler in response to movement of said input means from said second to said first position thereof.

16. In a photographic apparatus for use with roll film having a row of perforations, one for each film frame, particularly in a still camera for use with roll film which is stored in a magazine and one side of which is adjacent to a web of backing paper, a combination comprising film transporting means actuatable to move the film lengthwise in a predetermined direction and along a predetermined path; input means operable to actuate said film transporting means, said input means being movable between first and second positions to thereby actuate said film transporting means during movement from said first position; a movably mounted feeler adjacent to said path in line with the row of perforations and arranged to penetrate into an oncoming perforation when the film moves lengthwise and to thereupon move from a first to a second position in response to continued lengthwise movement of film along said path; locking means operable to deactivate said film transporting means in response to movement of said feeler to said second position; displacing means arranged to bias said feeler against the film while said feeler dwells in said first position and while said film transporting means is being actuated to move a perforation toward said feeler; restoring means arranged to bias said feeler to said first position upon completion of movement of said feeler to said second position; motion transmitting means operatively connected with said input means and arranged to effect movements of said displacing means and said restoring means in response to movement of said input means; disengaging means interposed between said motion transmitting means and said displacing means, said disengaging means being arranged to disengage said displacing means from said feeler in response to the making of an exposure and to permit said displacing means to bias said feeler against the film in said path in response to movement of said input means to said second position; and pusher means interposed between said motion transmitting means and said disengaging means.

17. A combination as defined in claim 16, further comprising coupling means connecting said pusher means to said disengaging means with limited freedom of movement.

18. A combination as defined in claim 17, wherein said coupling means comprises a pin-and-slot connection.

19. In a photographic apparatus for use with roll film having a row of perforations, one for each film frame, particularly in a still camera for use with roll film which is stored in a magazine and one side of which is adjacent to a web of backing paper, a combination comprising film transporting means actuatable to move the film lengthwise in a predetermined direction and along a predetermined path; input means operable to actuate said film transporting means, said input means being movable between first and second positions to thereby actuate said film transporting means during movement from said first position; a movably mounted feeler adjacent to said path in line with the row of perforations and arranged to penetrate into an oncoming perforation when the film moves lengthwise and to thereupon move from a first to a second position in response to continued lengthwise movement of film along said path; locking means operable to deactivate said film transporting means in response to movement of said feeler to said second position; displacing means arranged to bias said feeler against the film while said feeler dwells in said first position and while said film transporting means is being actuated to move a perforation toward said feeler; restoring means arranged to bias said feeler to said first position upon completion of movement of said feeler to said second position; motion transmitting means operatively connected with said input means and arranged to effect movements of said displacing means and said restoring means in response to movement of said input means; an indexible socket for multiple flash lamp holders; and indexing means operatively connected with said motion transmitting means and arranged to index said socket in response to movement of said input means to one of said positions.

20. A combination as defined in claim 19, wherein said motion transmitting means comprises a lever which is pivotable by said input means and includes an arm articulately connected with said indexing means, said socket having a plurality of projections one of which is engaged by said indexing means to thereby rotate said socket through a predetermined angle while said lever pivots in response to movement of said input means to said second position.

21. A combination as defined in claim 19, further comprising disengaging means operatively connected with said motion transmitting means and arranged to disengage said displacing means from said feeler in response to the making of an exposure, said disengagingg means further comprising means for disengaging said indexing means from said socket in the other position of said input means.

22. In a photographic apparatus for use with roll film having a row of perforations, one for each film frame, particularly in a still camera for use with roll film which is stored in a magazine and one side of which is adjacent to a web of backing paper, a combination comprising film transporting means actuatable to move the film lengthwise in a predetermined direction and along a predetermined path; input means operable to actuate said film transporting means; a movably mounted feeler adjacent to said path in line with the row of perforations and arranged to penetrate into an oncoming perforation when the film moves lengthwise and to thereupon move from a first to a second position in response to continued lengthwise movement of film along said path; locking means operable to deactivate said film transporting means in response to movement of said feeler to said second position; displacing means arranged to bias said feeler against the film while said feeler dwells in said first position and while said film transporting means is being actuated to move a perforation toward said feeler, said displacing means comprising means for operating said locking means in response to movement of said feeler to said second position, said displacing means being movable between a first position corresponding to said first position of said feeler and in which said displacing means biases said feeler against the film in said path and a second position corresponding to said second position of said feeler and in which said displacing means prevents said feeler from moving beyond said second position thereof, said displacing means having first and second recesses and said feeler having a follower which respectively extends into said first and second recesses in said first and second positions of said displacing means; restoring means arranged to bias said feeler to said first position upon completion of movement of said feeler to said second position; and stop means provided in the path of movement of said displacing means from said first position thereof and arranged to prevent said displacing means from moving beyond said second position.

23. A combination as defined in claim 22, wherein one of said recesses is deeper than the other of said recesses.

24. A combination as defined in claim 22, wherein said displacing means has a surface bounding a portion of said second recess and said follower abuts against said surface in said second position of said displacing means whereby said surface holds said feeler against movement beyond said second position thereof.

25. In a photographic apparatus for use with roll film having a row of perforations, one for each film frame, particularly in a still camera for use with roll film which is stored in a magazine and one side of which is adjacent to a web of backing paper, a combination comprising film transporting means actuatable to move the film lengthwise in a predetermined direction and along a predetermined path; input means operable to actuate said film transporting means, said input means being movable from a first position to a second position and being arranged to actuate said film transporting means during a first stage of movement to said second position; output means movable by said input means during a second stage of movement of said input means to said second position; a movably mounted feeler adjacent to said path in line with the row of perforations and arranged to penetrate into an oncoming perforation when the film moves lengthwise and to thereupon move from a first to a second position in response to continued lengthwise movement of film along said path; locking means operable to deactivate said film transporting means in response to movement of said feeler to said second position; displacing means arranged to bias said feeler against the film while said feeler dwells in said first position and while said film transporting means is being actuated to move a perforation toward said feeler, said locking means comprising a lever having a first arm normally engaging said output means to hold the latter against movement during said first stage of movement of said input means and a second arm pivotable by said displacing means in response to penetration of said feeler into an oncoming perforation to thereby disengage said first arm from said output means, said displacing means being arranged to pivot said second arm and to thus disengage said first arm of said lever from said output means in the absence of film in said path and said displacing means being provided with a notch which receives a portion of said feeler when said displacing means disengages said lever from said output means; and restoring means arranged to bias said feeler to said first position upon completion of movement of said feeler to said second position.

* * * * *